July 3, 1956
F. D. EBERSOLD
2,752,705
ROL-A-MAP
Filed March 23, 1953
2 Sheets-Sheet 1
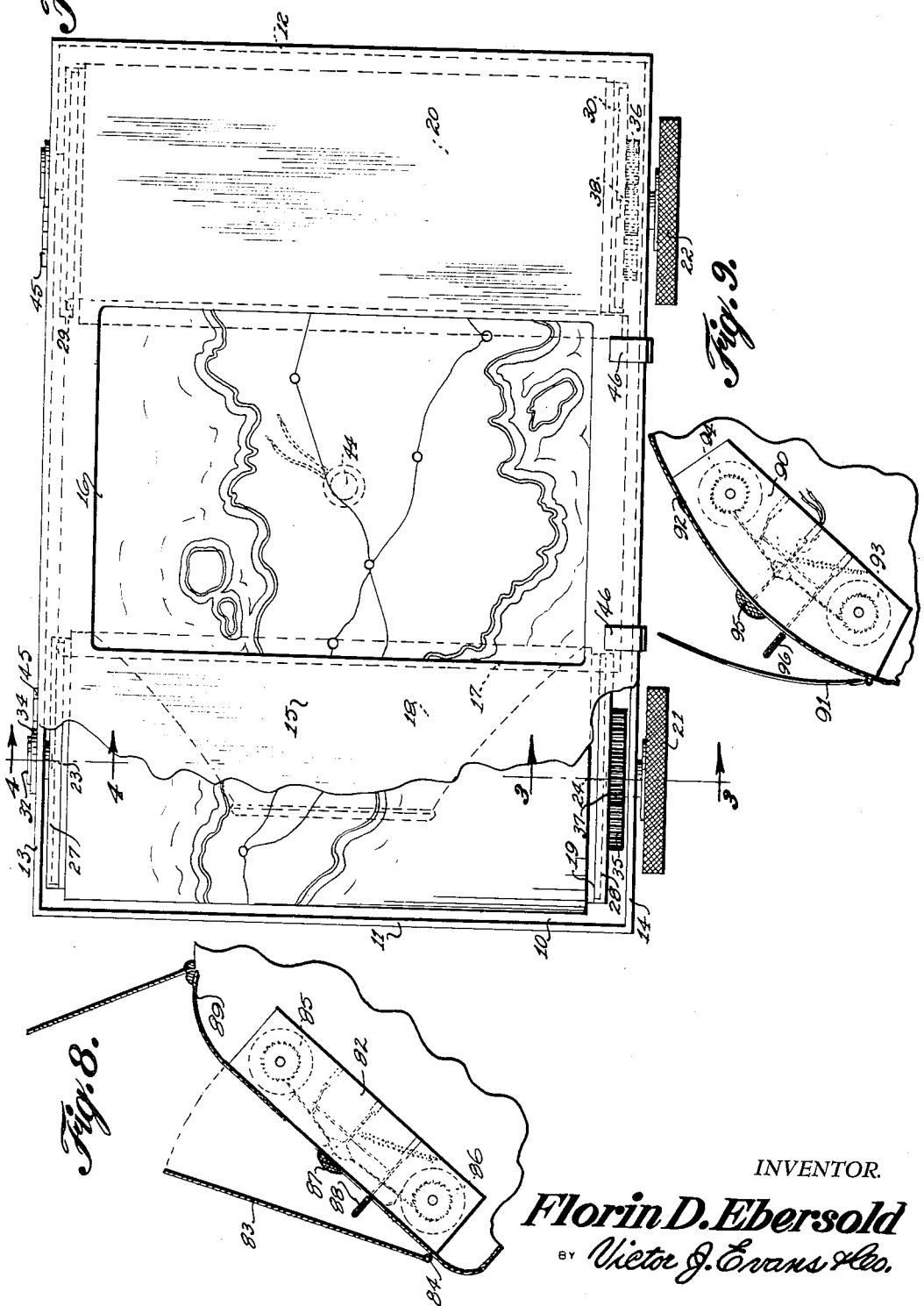
INVENTOR.
Florin D. Ebersold
BY Victor J. Evans &Co.
ATTORNEYS July 3, 1956
F. D. EBERSOLD
2,752,705
ROL-A-MAP
Filed March 23, 1953
2 Sheets-Sheet 2
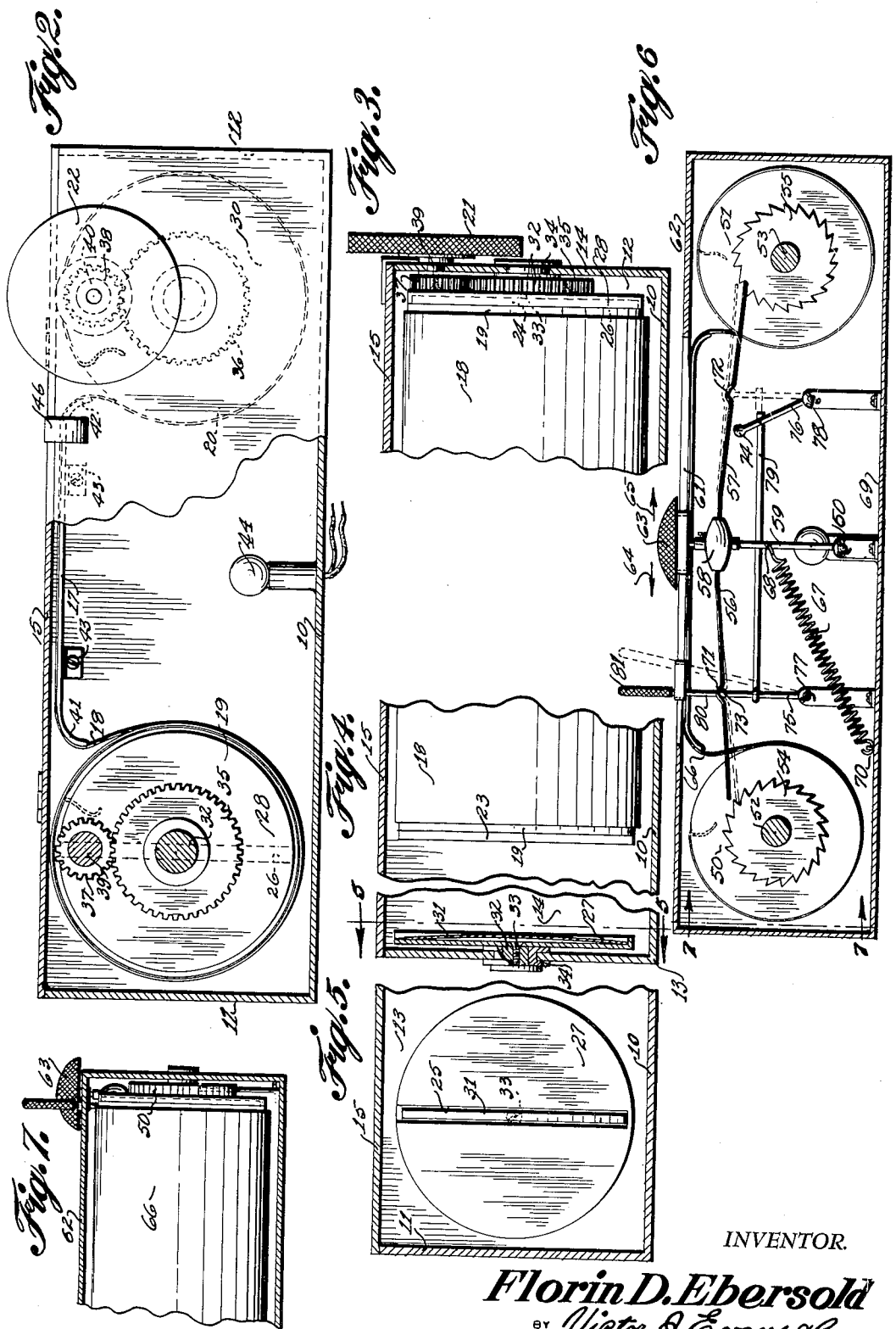
INVENTOR.
Florin D. Ebersold
BY Victor J. Evans & Co.
ATTORNEYS United States Patent Office 2,752,705
Patented July 3, 1956

2,752,705
ROL-A-MAP
Florin D. Ebersold, Lantana, Fla.
Application March 23, 1953, Serial No. 343,844
3 Claims. (Cl. 40—86)

This invention relates to devices for holding and displaying maps used primarily in driving long trips in motor vehicles, and in particular a casing adapted to be mounted on or installed in an instrument panel of a motor vehicle with an open window covered with transparent material and with rolls above and below the window, similar to the spools of a film camera and means for actuating the rolls to draw the map across the area below the window.

The purpose of this invention is to provide a manually actuated display device for showing maps in strip form and wherein means is provided for advancing the map to correspond with travel of the vehicle.

Various devices have been provided for holding maps in motor vehicles particularly to facilitate travel, however, conventional devices of this type are objectionable because it is difficult to support the housing or casing in such a position that the map can be followed by the operator of a vehicle. With this thought in mind this invention contemplates an improved map holder in which the parts are arranged whereby the device may be mounted directly upon or installed in the instrument panel of a motor vehicle so that the map is positioned to be readily followed by the operator of the vehicle.

The object of this invention is, therefore, to provide means for mounting a map in strip form in a map holder whereby the map may be manually advanced or moved in either direction and whereby the device may readily be installed in such a position that the map may be followed by the operator of the vehicle.

Another object of the invention is to provide a holder for retaining maps in strip form to facilitate following a predetermined course in which the map may readily be removed and replaced.

A further object of the invention is to provide a map holder which is of a simple and economical construction.

With these and other objects and advantages in view the invention embodies a housing having a base with a hinged cover with means for journaling spools on the base and also means for rotating the spools to move a map rolled on the spools across an area positioned to register with a window in the cover.

Other features and advantages of the invention will appear from the following description taken in connection with the drawings, wherein:

Figure 1 is a plan view illustrating the improved map holder with part of the casing broken way showing the mounting of one of the rollers therein.

Figure 2 is a side elevational view showing the improved map holder, and in which parts are broken away showing a longitudinal section through the holder and illustrating gears for rotating map holding rollers or spools in the holder.

Figure 3 is a cross section through one side of the holder taken on line 3—3 of Fig. 1 also showing the gears for rotating the map holding rollers or spools.

Figure 4 is a cross section taken on line 4—4 of Fig. 1 with parts broken away illustrating the mounting of the ends of the rollers in discs journaled in the sides of the housing wherein tongues on the ends of the rollers are frictionally held in slots in the discs.

Figure 5 is a section taken on line 5—5 of Fig. 4 also showing the slots in the discs in which the rollers are mounted.

Figure 6 is a longitudinal section through the housing illustrating a modification wherein the rollers are actuated with ratchets instead of the gears shown in Figs. 1 to 3.

Figure 7 is a section taken on line 7—7 of Fig. 6 showing the mounting at one end of one of the rollers and illustrating the ratchet for actuating the rollers.

Figure 8 is a section through the instrument board of a motor vehicle illustrating the installation of the map holder in the instrument board or panel and showing a cover for the map holder, hinged to the panel.

Figure 9 is a section similar to that shown in Fig. 8 showing the device installed in an instrument panel having an arcuate outer surface.

Referring now to the drawings wherein like reference characters denote corresponding parts the improved map holder of this invention includes a housing having a base 10 with end walls 11 and 12, side walls 13 and 14 and a cover 15 in which a window 16 is provided, a platform 17 positioned below the window and over which a strip of material 18 having a map thereon is positioned, and rollers 19 and 20 journaled in the housing and adapted to be actuated by knobs 21, and 22.

To facilitate removing and replacing the rollers or spools, the rollers are provided with tongues 23 and 24 and the tongues are positioned to slide in grooves 25 and 26, respectively, of discs 27 and 28 at the ends of the roll 19, and 29 and 30 at the end of the roll 20. The slots of the discs are provided with springs, as indicated by the numeral 31 as shown in Figs. 4 and 5 and with the springs positioned in the slots the rollers are frictionally held whereby they may readily be removed and replaced.

As illustrated in Fig. 4 the discs in which the ends of the rollers are mounted, are journaled in the side walls of the housing with studs 32 to which the discs are secured by screws 33 and the studs are journaled in bushings 34. It will be understood that the discs may be journaled in the housing by other suitable means.

The discs 28 and 30, at one side of the housing are provided with gears 35 and 36, respectively and the gears mesh with pinions 37 and 38 which are mounted on stub shafts 39 and 40 on the outer ends of which the knurled knobs or discs 21 and 22 are mounted.

With the parts mounted in this manner the strip of tape 18 with a map on the upper surface may readily be moved across the platform 17 which is provided with arcuate ends 41 and 42 and which is supported with clip angles 43 whereby the map may be rolled on either the roller 19 or the roller 20.

The housing is provided with a light 44 and the cover 15 is hinged to the side wall 13 with the hinges 45 and secured at the opposite side with clips 46.

The window 16 in the cover may be open or may be provided with transparent material as may be desired.

In the design illustrated in Figs. 6, 7, 8 and 9 map carrying rollers 50 and 51, journaled on shafts 52 and 53, respectively are provided with ratchet wheels 54 and 55 that are adpated to be actuated by elongated pawls 56 and 57 extended from a socket 58 mounted on a lever 59 which is pivotally mounted in a support 60. The upper end of the lever 59 extends through a slot 61 in a cover 62 of the housing and the lever is adapted to be actuated by a button 63 on the extended end of the lever. By moving the button 63 longitudinally on the casing as indicated by the arrows 64 and 65 the pawls 56 or 57 engage the teeth of the ratchet wheels 54 and 55 causing the rollers to wind the tape 66 on which the map is positioned. A spring 67 which is attached to the lever 59 at the point 68 at one end and to the base 69 of the housing at the point 70 actuates the lever 59 and button 63 in one direction whereby the map tape may be actuated by pushing the button 63 in the direction of the arrow 65 and then releasing the button.

The pawls 56 and 57 are provided with notches 71 and 72 and projections 73 and 74 are adapted to be, alternately, positioned in said notches to retain one of the pawls in an upwardly extended position whereby it will not engage the teeth of its ratchet.

The projections 73 and 74 are mounted on the upper ends of arms 75 and 76 which are pivotally mounted in the upper ends of bearings 77 and 78 whereby with the arms connected by the rods 79 it will be possible for only one of the projections to be positioned in its notch at one time. The arm 75 is provided with an extension 80 and the arms are actuated by a handle 81 whereby the rolls may be alternately actuated to wind the map tape. With the handle 81 in the position shown in full lines the pawl 57 is in engagement with the ratchet wheel 55 whereby upon movement of the button 63 the roller 51 will operate to roll the map tape thereon, whereas with the handle 81 in the position shown in dotted lines the pawl 56 will be released and the pawl 57 elevated to the position shown in dotted lines, whereby upon movement of the button 63 the pawl 56 will rotate the roller 50 to wind the map tape thereon.

Figures 8 and 9 illustrate different positions of the housing, which is indicated by the numeral 82, in Fig. 8 and in this design the housing is provided with a hinge cover 83 that is pivotally connected to the end of the housing at the point 84. In this design a tape on which a map is positioned is adapted to be rolled on rollers 85 and 86 and the rollers are adapted to be actuated by a button 87, similar to the button 63. The direction in which the map tape travels is regulated by the handle 88. The housing 82 is positioned in an instrument panel 89 and it will be understood that the instrument panel may be of any suitable design.

In the design illustrated in Fig. 9 a housing 90 with a hinge cover 91 is positioned in an instrument panel 92 and the map strip is mounted on rollers 93 and 94 which are adapted to be actuated by a button 95 and the control handle 96. It will be understood that the shape and design of the housing may, therefore, be changed to correspond with instrument panels of different types of motor vehicles and the rollers upon which the strip of tape with the map thereon is positioned may be actuated by suitable means.

It will be understood that other modifications, within the scope of the appended claims, may be made in the design and arrangement of the parts without departing from the spirit of the invention.

What is claimed is:

1. A map mounting comprising a housing having a window in the upper surface, a platform mounted in the housing and positioned below the window, rollers in the housing and positioned on opposite sides of said window, discs journaled in opposite sides of the housing and having slots in the faces thereof, springs mounted in the discs and positioned to extend into said slots, said rollers having tongues on the ends positioned to extend into the slots of the discs, a strip of material having a map thereon positioned on said rollers, a ratchet wheel on each of said rollers, a socket mounted intermediate of said rollers, a pair of elongated pawls with one end of each pawl connected to said socket, a lever mounting said socket, a button on said lever for moving said pawls for rotating said rollers to carry the strip of material with the map thereon across said window, a pair of arms cooperating with said pawls, a rod connecting said arms for simultaneous movement and a handle extended from one of said arms for the movement of said arms to change the direction of rotation of said rollers.

2. In a map holder, the combination which comprises a housing adapted to be installed in an instrument panel of a motor vehicle, said housing having a window in the upper surface, a platform positioned below the window of the housing, rollers positioned at the ends of the platform, said rollers having tongues on the ends thereof, discs journaled in the walls of the housing and having slots therein positioned to receive the tongues of the rollers, friction means in the discs for retaining the rollers in position therein, a strip of material positioned on the rollers and extended over said platform, a ratchet wheel on each of said rollers, a socket mounted intermediate of said rollers, a pair of elongated pawls with one end of each pawl connected to said socket, a lever mounting said socket, a button on said lever for moving said pawls for rotating the rollers for moving the strip of material across the platform, a pair of arms cooperating with said pawls, a rod connecting said arms for simultaneous movement and a handle extended from one of said arms for the movement of said arms to change the direction of rotation of said rollers.

3. In a map holder, the combination which comprises a housing adapted to be installed in an instrument panel of a motor vehicle, said housing having a window in the upper surface, a platform positioned below the window of the housing, rollers positioned at the ends of the platform, said rollers having tongues on the ends thereof, discs journaled in the walls of the housing and having slots therein positioned to receive the tongues of the rollers, friction means in the discs for retaining the rollers in position therein, a strip of material positioned on the rollers and extended over said platform, knobs journaled in the sides of the casing, a ratchet wheel on each of said rollers, a socket mounted intermediate of said rollers, a pair of elongated pawls with one end of each pawl connected to said socket, a lever mounting said socket, a button on said lever for moving said pawls for rotating the rollers as the knobs are turned manually, a pair of arms cooperating with said pawls, a rod connecting said arms for simultaneous movement and a handle extended from one of said arms for the movement of said arms to change the direction of rotation of said rollers.

References Cited in the file of this patent
UNITED STATES PATENTS

| | | |
|---|---|---|
| 557,024 | Richard | Mar. 24, 1896 |
| 581,500 | Webb | Apr. 27, 1897 |
| 755,735 | Bissel | Mar. 29, 1904 |
| 1,548,208 | Reisiger | Aug. 4, 1925 |
| 1,632,465 | Farmer | June 14, 1927 |
| 2,414,820 | Larson | Jan. 28, 1947 |
| 2,591,844 | Macripo | Apr. 8, 1952 |